(12) United States Patent
Nakamura

(10) Patent No.: US 7,042,495 B2
(45) Date of Patent: May 9, 2006

(54) PICTURE TRANSMISSION UNIT AND PICTURE TRANSMISSION SYSTEM

(75) Inventor: Natsuki Nakamura, Tokyo (JP)

(73) Assignees: Sel Corporation, Tokyo (JP); Kyowa Denshikogyo Co., Osaka (JP)

( * ) Notice: Subject to any disclaimer, the term of this patent is extended or adjusted under 35 U.S.C. 154(b) by 835 days.

(21) Appl. No.: 10/185,010

(22) Filed: Jul. 1, 2002

(65) Prior Publication Data
US 2003/0043281 A1   Mar. 6, 2003

(30) Foreign Application Priority Data

Sep. 6, 2001   (JP)   ............................. 2001-270949
May 21, 2002   (JP)   ............................. 2002-146819

(51) Int. Cl.
*H04N 5/225* (2006.01)

(52) U.S. Cl. .................................. 348/207.1; 348/373

(58) Field of Classification Search .......... 348/207.99, 348/207.1, 375, 361
See application file for complete search history.

(56) References Cited

U.S. PATENT DOCUMENTS

| | | | | |
|---|---|---|---|---|
| 4,937,676 A * | 6/1990 | Finelli et al. | ................ | 348/375 |
| 6,111,604 A * | 8/2000 | Hashimoto et al. | ...... | 348/220.1 |
| 6,445,410 B1 | 9/2002 | Kawano | | |
| 6,693,665 B1 * | 2/2004 | Shindo et al. | ............ | 348/207.2 |
| 2002/0018126 A1 | 2/2002 | Ikeda et al. | | |
| 2004/0105024 A1 * | 6/2004 | Takahashi | .............. | 348/333.01 |

FOREIGN PATENT DOCUMENTS

| | | |
|---|---|---|
| JP | 04207476 A | 7/1992 |
| JP | 09181936 A | 7/1997 |
| JP | 2000066969 A | 3/2000 |

OTHER PUBLICATIONS

Abstract of JP 8018839, Jan. 19, 1996.

* cited by examiner

*Primary Examiner*—Tuan Ho
(74) *Attorney, Agent, or Firm*—Dickstein Shapiro Morin & Oshinsky LLP

(57) ABSTRACT

The picture transmission system is used in a monitoring system etc., and which transmits picture information obtained through video camera unit and sound information from a microphone, speaker or such via networks. The picture transmission system is composed of a video camera unit selected to meet the intended purpose in combination with a common picture transmission unit, which compresses the output signal from the video camera unit according to a prescribed coding format and transmits it to network etc. according to a prescribed protocol at a prescribed transmission rate. The compression/coding means and the transmission/coding means provided within the picture transmission unit each has a rewritable nonvolatile memory for storing programs with procedures corresponding to the coding format and the communication protocol respectively, a digital signal processor which executes signal processing according to the program stored in the memory, and a field programmable logic array which executes logical operation according to set logic conditions. For this reason, prescribed functions can be set without altering hardware by changing the program and the logic conditions.

13 Claims, 9 Drawing Sheets

PICTURE TRANSMISSION UNIT AND PICTURE TRANSMISSION SYSTEM

BACKGROUND ART

1. Field of the Invention

This invention relates to a picture transmission unit and a picture transmission system, which are used in a monitoring system, a remote medical system, a television conference system and the like, and which transmit picture data information obtained through a video camera unit and sound information from a microphone, speaker or such via networks.

2. Description of the Prior Art

Conventionally, as the techniques belonging to this field, the following document has been disclosed. Document 1: Japanese Laid-Open Patent Publication 2000-66969, entitled "Image Data Transfer System, Camera Incorporated Recording/Reproducing Device and Server", published on Mar. 3, 2000.

Document 1 discloses a picture transmission apparatus and a technique for a picture transmission system using the same. According to this system, when picture is taken and is transmitted to a distant place, a picture transmission system having a video camera, transfer command means, and transmission means unified with each other is used.

In such a type of picture transmission apparatus, a subject is taken by the video camera to obtain picture information. Upon specifying the destination of transmission through the transmission command means, the information for the destination of transmission and the picture in formation are sent to a network, which are then sent to the picture transmission apparatus or such of the destination of transmission. Consequently, users should purchase a picture transmission apparatus having a quality of the picture to be taken, conditions concerning the network and other conditions in agreement with the intended purpose.

The conventional picture transmission apparatus as disclosed in Document 1, however, has the following problems:

When one wants to use a picture transmission apparatus having already been purchased is used under different conditions, the conventional picture transmission apparatus is not applicable and, thus a picture transmission apparatus applicable to new intended purpose should be newly purchased. For example, if one wants to improve resolution of the video camera, one should replace not only the video camera but also whole of the picture transmission apparatus including the transmission command means and communication means by new apparatus. For this reason, there arises a problem concerning a requirement for much more cost for the replacement.

SUMMARY OF THE INVENTION

The first object of the present invention is to provide a picture transmission unit, which can realize functions to meet an intended purpose with ease and at a low cost only by replacing. a video camera unit with new one.

The second object of the present invention is to provide a picture transmission unit, which can make a designation and the like to a video camera unit side by a voice.

The third object of the present invention is to provide a picture transmission unit, which can remotely control a video camera unit.

The fourth object of the present invention is to provide a picture transmission unit, which can securely holds a video camera unit at a prescribed position of the picture transmission unit.

The fifth object of the present invention is to provide a picture transmission unit, which can be connected to a video camera unit only having basic functions using a first connector and which can be connected to a video camera unit having both basic functions and control functions such as a zooming-up function using first and second connectors.

The sixth object of the present invention is to provide a picture transmission unit, which is applicable to various compression coding formats, communication protocols, transmission rates and the like in the same hardware by rewriting program and by changing the setting of logic conditions.

The seventh object of the present invention is to provide a picture transmission unit, which is applicable to various transmission mediums without alternation of hardware.

The eighth object of the present invention is to provide a picture transmission system, which can realize the first to seventh objects.

The ninth object of the present invention is to provide a picture transmission system, which can make a two-way transmission of a picture signal and a sound signal, and which can further realize a function to meet an intended purpose at a low cost and with ease only by replacing a video camera unit by one having different functions.

Tenth object of the present invention is to provide a picture transmission system, which can easily replace a video camera unit with any other video camera unit having different functions to a picture transmission unit.

The eleventh object of the present invention is to provide a picture transmission system, which can easily connect a video camera unit having low functions to a picture transmission unit, and which can further miniaturized.

A picture transmission unit according to a first aspect of the present invention in order to attain these and other objects comprises: a camera holding mechanism portion which detachably holds a video camera unit having at least one connector at a prescribed portion; a connector portion having at least one connector provided so that the corresponding connector can be inserted into the connector of the video camera unit side; compression/coding means, which converts an output signal from the video camera unit into a compressed signal according to a prescribed coding format and outputs it; transmission/coding means, which converts said compressed signal into a coded signal for transmission according to a prescribed communication protocol and outputs it; and interface means, which converts said coded signal into a signal corresponding to a prescribed transmission medium, and transmits it to said transmission medium.

By utilizing such a configuration in the picture transmission unit according to the first aspect of the present invention, the video camera unit having at least one connector is detachably held by the camera holding mechanism portion at a prescribed position, and the connector of the connector portion is inserted into the connector of the video camera unit side. The output signal from the video camera unit is given to the picture transmission unit via the connector, and is converted into a compressed signal by the compression/coding means according to a prescribed coding format. The produced compressed signal is converted into a coded signal for transmission by the transmission/coding means according to a prescribed communication protocol. Furthermore, the coded signal for transmission is the converted into a signal corresponding to a transmission medium and is transmitted to the transmission medium. By such a configuration, a video camera unit having required functions can be selected from among the video camera units to meet an intended purpose, and it can be combined with the picture transmission unit. Accordingly, the first aspect of the present invention can easily realize the functions to meet the intended purpose.

A picture transmission unit according to a second aspect of the present invention comprises: a camera holding mechanism portion which detachably holds a video camera unit having at least one connector at a prescribed portion; a connector portion having at least one connector provided so that the corresponding connector can be inserted into the connector of the video camera unit side; compression/coding means, which converts an output signal from the video camera unit into a compressed signal according to a prescribed coding format and outputs it; audio signal decoding means, which decodes a given coded audio signal to be converted into an analog audio signal, and outputs it to said video camera unit; transmission/coding means, which converts said compressed signal into a coded signal for transmission according to a prescribed communication protocol and outputs it, and which outputs said coded audio signal to said audio signal decoding means; and interface means, which inputs the coded signal and converts it to a signal corresponding to a prescribed transmission medium, and transmits it to said transmission medium, and which receives the coded audio signal having been transmitted via transmission medium, and give it to said transmission/coding means.

Through such a configuration, the output signal from the video camera unit is converted into a compressed signal through the compression/coding means, and then converted into a coded signal by the transmission/coding means, which is then transmitted to the transmission medium through the interface means. The coded audio signal having been transmitted from the transmission medium is received by the interface means, and is given to the audio signal decoding means by the transmission/coding means. The audio signal decoding means converts the given coded audio signal into an analog audio signal and outputs it to the video camera unit. This makes it possible to make a designation etc. to the video camera unit side by an audio.

A picture transmission unit according to a third aspect of the present invention comprises: a camera holding mechanism portion which detachably holds a video camera unit having at least one connector at a prescribed portion; a connector portion having at least one connector provided so that the corresponding connector can be inserted into the connector of the video camera unit side; compression/coding means, which converts an output signal from the video camera unit into a compressed signal according to a prescribed coding format and outputs it; control signal decoding means, which decodes a given transmission control signal and outputs a control signal for controlling the whole of the video camera unit; transmission/coding means, which converts said compressed signal into a coded signal for transmission according to a prescribed communication protocol and outputs it, and which outputs said transmission control signal to give it to said control signal decoding means; and interface means, which inputs the coded signal, converts it into a prescribed signal and transmits it to said transmission medium, and which receives the transmission control signal transmitted via the transmission medium and gives it to the transmission/coding means.

Through such a configuration, the output signal of the video camera unit is converted into the compressed signal by the compression/coding means, and converted into the coded signal for transmission by the transmission/coding means, after which it is transmitted to the transmission medium through the interface means. The transmission control signal transmitted from the transmission medium is received by the interface means, and is given to the control signal decoding means by the transmission/coding means. The control signal decoding means decodes the given transmission control signal and outputs the control signal to the video camera unit. This makes it possible to control the video camera unit from a remote side.

As for a picture transmission unit according to fourth aspect of the present invention, in the picture transmission unit according to any one of the first to third aspects of the present invention, the camera holding mechanism portion possesses a fulcrum for slidably guiding and supporting the video camera unit to a prescribed position and a lock pin holder for holding a lock pin residing at the video camera unit side. This makes it possible to securely hold the video camera unit at a prescribed position of the picture transmission unit.

As for a picture transmission unit according to fifth aspect of the present invention, in the picture transmission unit according to any one of the first to third aspects of the present invention, the connector portion has a first connecter for receiving a signal outputted from the video camera unit and a second connecter for transmitting a signal for the video camera unit. According to such a configuration, a video camera unit only having basic functions is connected to the first connecter, while a video camera unit having basic functions and control functions such as a zooming-up function is connected to the first and second connectors.

As for a picture transmission unit according to sixth aspect of the present invention, in the picture transmission unit according to any one of the first to third aspects of the present invention, the compression/coding means and the transmission/coding means each has a rewritable nonvolatile memory for storing programs with procedures corresponding to the coding format and the communication protocol respectively, a digital signal processor (hereinafter referred to as "DSP"), which executes signal processing according to the program stored in the memory, and a field programmable logic array (hereinafter referred to as "FPLA"), which executes logical operation according to the set logic conditions.

Through such a configuration, the output signal of the video camera unit is given to the picture transmission unit via the connector, and is converted into a compressed signal according to a prescribed coding format by the transmission/coding means composed, for example, of a memory, DSP, and FPLA. This rewrites the program within the memory and alters the logic conditions of FPLA, whereby the same hardware can be used to deal with various compression/coding formats, various transmission rates, etc.

As for a picture transmission unit according to seventh aspect of the present invention, in the picture transmission unit according to any one of the first to third aspects of the present invention, the interface means has interfaces corresponding to a cable signal, a wireless signal and an optical signal. This makes it possible to convert the coded signal for transmission into a signal corresponding to the transmission medium such as the cable signal, wireless signal or optical signal to be transmitted. For this reason, the picture transmission unit of the present invention is applicable to various transmission mediums without changing any hardware.

A picture transmission system according to an eighth aspect of the present invention comprises any one of the picture transmission unit according to the first to seventh aspect of the present invention and a video camera unit corresponding to the picture transmission unit.

A picture transmission system according to a ninth aspect of the present invention has a picture transmission unit connected to a prescribed transmission medium and a plurality kind of video camera units to be connected to the picture transmission unit in a replaceable manner.

The picture transmission unit comprises compression/coding means, which converts a picture signal inputted from the video camera unit into a compressed picture signal according to a coding program with a procedure corresponding to a prescribed coding format and first logic conditions and outputs it; control signal decoding means, which decodes a given transmission control signal to produce a control signal, and which outputs the produced control signal to the video camera unit; an audio signal encoder, which compresses and encodes a first analog audio signal inputted from external voice and sound/audio signal converting means; an audio signal decoder, which expands and decodes a given second compressed digital audio signal and outputs a second analog audio signal to external audio signal/audio converting means; transmission/coding means, which converts the compressed picture signal and the first compressed digital audio signal into a first encoded signal and outputs it, and which receives a given second encoded signal to be separated into the transmission control signal and the second digital audio signal, and gives them to the control signal decoding means and the audio signal decoder respectively; and interface means, which inputs the first encoded signal, converts it into a signal corresponding to the transmission medium, and transmit it to the transmission medium, and which receives the second encoded signal transmitted from the transmission medium, and gives it to the transmission/coding means.

The first video camera unit within the plurality kind of the video camera units possesses a first optical lens system, which takes a subject to obtain a first optical image; first photoelectric conversion means, which converts the first optical image into an electric signal and outputs it; first picture signal producing means, which is detachably connected to the compression/coding means, and which inputs the electric signal outputted from the first photoelectric conversion means to produce the picture signal, and gives it to the compression/coding means; and camera control means, which is detachably connected to the control signal decoding means, and which input the control signal outputted from the control signal decoding means to totally control the video camera units.

The second video camera unit within the plurality kind of the video camera units possesses a second optical lens system, which takes a subject to obtain a second optical image; second photoelectric conversion means, which converts the second optical image into an electric signal and outputs it; and second picture signal producing means, which is detachably connected to the compression/coding means, and which inputs the electric signal outputted from the second photoelectric conversion means to produce the picture signal, and gives it to the compression/coding means.

Through such a configuration, if one video camera unit amongst the plurality kind of the video camera units, for example, the first video camera unit, is connected to the picture transmission unit, the picture data taken by this first video camera unit is transmitted to the transmission medium through the picture transmission unit. The second encoded signal transmitted from the transmission medium is received by the interface means, and is separated into the transmission control signal and the second compressed digital audio signal by the transmission/coding means. The transmission control signal is decoded by the control signal decoding means, and the control signal resulting in the decoding is given to the camera control means within the first video camera unit to totally control this video camera unit. The separated second digital compressed audio signal is expanded and decoded by the audio signal decoder, then is converted into the second analog audio signal and sound is generated from the external audio signal/audio converting means. If the second video camera unit amongst the plurality kind of the video camera units is connected to the picture transmission unit, only the picture data taken by the second video camera unit is transmitted to the transmission medium through the picture transmission unit. According to such a configuration, the functions to meet the intended purpose can easily be realized only by replacing the video camera unit.

As for a picture transmission system according to a tenth aspect of the present invention, in the ninth aspect of the present invention, the picture transmission unit and each of the video camera units are configured that they are connected to each other via a cable with a detachable connector. This can easily connect the picture transmission unit to each of the video camera units via a cable with a connector.

As for a picture transmission system according to an eleventh aspect of the present invention, in the ninth aspect of the present invention, the picture transmission unit and the second video camera unit are configured to be accommodated within the same case, and to connect the picture transmission unit and the second video camera unit to each other via a cable with a detachable connector. According to this configuration, the picture transmission unit and the second video camera unit are connected with each other via a cable with a connector to thereby make the system small.

It will be understood that these and other objects and the features of this invention can be clarified by the following preferred embodiments with reference to the attached drawings. However, it should be noted that the drawings are only by the way of the explanation and never restricts the scope of the present invention.

DESCRIPTION OF THE PREFERRED EMBODIMENTS

Embodiments of the present invention will now be described by referring to the attached drawings. The term "picture transmission" unit or system to be used herein can be interchangeably used with "video transmission" or "image transmission" unit or system. Also, all means intended herein should be interpreted to encompass hardware such as devices, and circuits, software such as programs, and the combination thereof.

First Embodiment (FIGS. 1 to 5)

Figure 1:
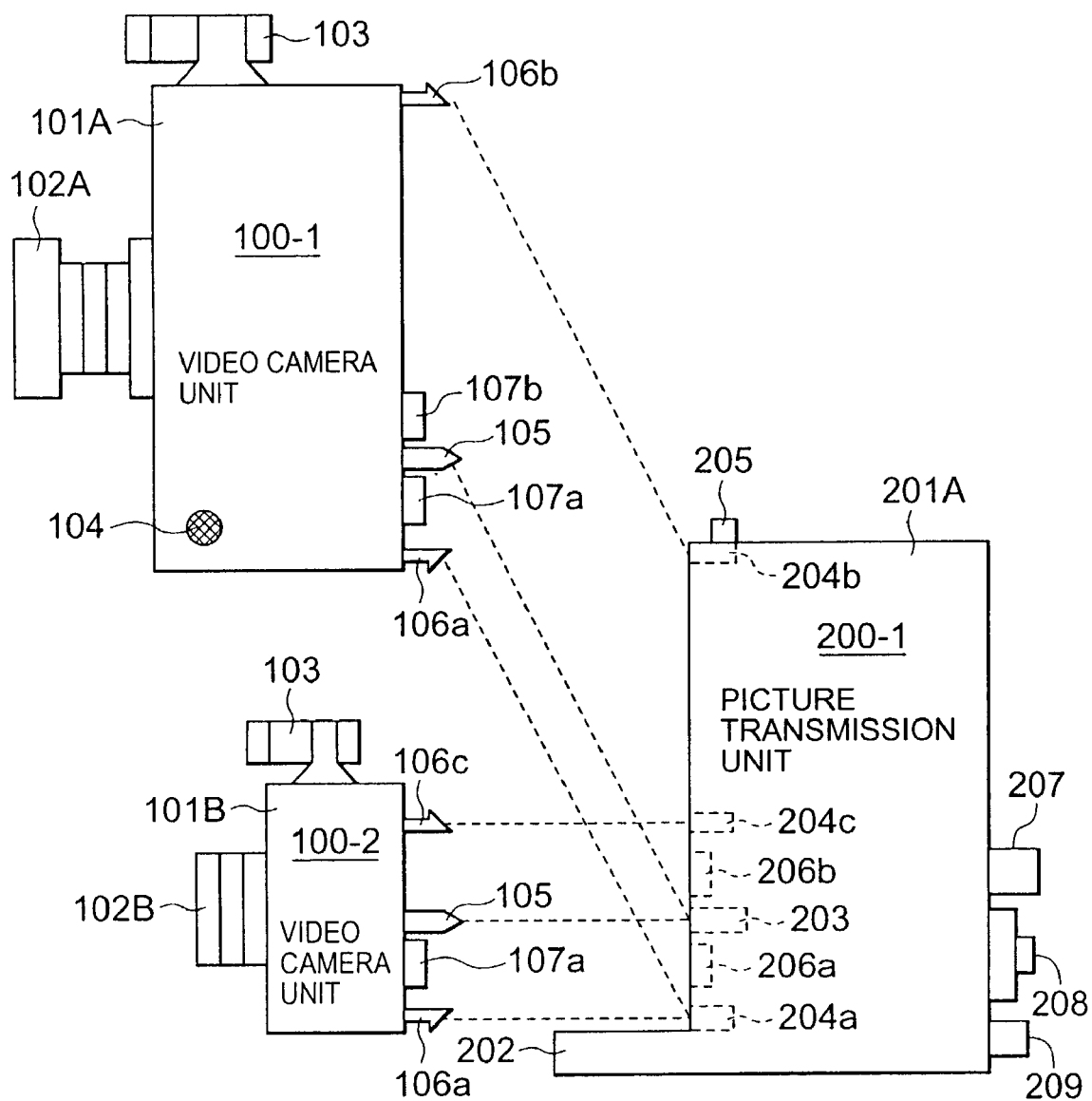
FIG. 1 shows a configuration of a picture transmission system according to the first preferred embodiment of the present invention.

A picture transmission system shown in FIG. 1 is used in an executive system or such and is the system which is composed of a video camera unit, for example, large size first video camera unit 100-1 or small second size video camera unit 100-2, selected according the intended purpose amongst a plurality kind of video camera units in combination with picture transmission unit 200-1, which is common to video camera units 100-1 and 100-2.

Large size first video camera unit 100-1 is a high function apparatus, which can adjust the focus of lens and zooming by a remote control, and the body of the unit is accommodated within case 101A. Onto a front side of case 101A is equipped first lens system 102A. First lens system 102A is a device, which takes a subject to obtain a first optical image, and is composed of a plurality of lenses which can make an adjustment of the focus and of zooming and the like. Audio/audio signal conversion means (such as microphone) 103 and audio signal/audio conversion means (such as speaker) 104 are each provided on a prescribed portion of case 101A. Onto a rear surface of case 101A is projected guide pin 105 to bind case 101A onto picture transmission unit 200-1 at a prescribed potion. Lock pins 106a and 106b are projected on a lower portion and an upper portion of the rear surface of case 101A to fix case 101A onto picture transmission unit 200-1.

First connector 107a and second connector 107b are fitted near guide pin 105. First connector 107a is a part which outputs a picture signal taken and a basic signal such as a first analog audio signal collected from microphone 103 to the side of picture transmission unit 200-1. The electric power for video camera unit 100-1 is configured to be supplied via connector 107a. Second connector 107b is a parts which inputs additional signal given from the side of picture transmission unit 200-1, such as a control signal for lens system 102A or such, and a second analog audio signal to be outputted to speaker 104.

Small size second video camera unit 100-2 is a simplified apparatus whose focus of the lens is fixed, and the body of this unit is accommodated within case 101B. To the front surface of case 101B is fitted second lens system 102B. Second lens system 102B is a device, which takes a subject to obtain a second optical image, and composed of one or more lenses whose focus is fixed. Microphone 103 similar to that of the side of video camera unit 100-1 is provided on a prescribed portion of case 101B. Similar to the side of video camera unit 100-1, guide pin 105 is projected onto a rear surface of case 101B to bind case 101B onto picture transmission unit 200-1 at a prescribed potion.

Lock pins 106a and 106c are projected on a lower portion and an upper portion of the rear surface of case 101B to fix case 101B onto picture transmission unit 200-1. Similar to the side of video camera unit 100-1, basic first connector 107a is fitted near guide pin 105. However, since second video camera unit 100-2 has no control function and no speaker, it has no additional connector corresponding to second connector 107b.

In each of cases 101A, and 101B, guide pin 105, lock pin 106a and connector 107a provided on the rear surface are disposed at the same position. Another lock pins 106b and 106c are provided on a different position to meet the size of each of cases 101A and 101B.

In contrast, picture transmission unit 200-1 is a unit used to be commonly combined with large size video camera unit 100-1 or small size video camera unit 100-2, and the body of this unit is accommodated within case 201A. Fulcrum 202 having a groove for sliding video camera unit 100-1 or 100-2 to be fixed at a prescribed position is provided on a lower portion of the front surface of case 201A.

Guide pin holder 203 in to which guide pin 105 of video camera unit 100-1 or 100-2 is inserted and lock pin holders 204a, 204b, and 204c into which lock pins 106a, 106b, and 106c are inserted are provided on an upper portion of the front surface of case 201A. Lock pin holders 204a–204c has a function that they latch projections or holes of lock pins 106a–106 by a lock mechanism worked by a spring so that inserted lock pins 204a–204c are fixed not to be loosed. A mechanism for holding a camera is composed of fulcrum 202, lock pin holders 204a–204c, and the like. At a prescribed position, such as an upper portion, of case 201A, button 205 for releasing lock is provided for releasing of the latch.

A connector portion is provided near guide pin holder 203. The connector portion possesses first connector 206a to be connected with first connector 107a of the side of video camera unit 100-1 or 100-2, and second connector 206b to be connected with second connector 107b of the side of video camera unit 100-1. First connector 206a is a connector, which supplies electric power to video camera unit 100-1 or 100-2, and which inputs basic signal such as a picture signal and a first analog audio signal. Second connector 206b is a connector which outputs a control signal such as adjustment of focus and adjustment of zooming and the like, and the second analog audio signal and the like to video camera unit 100-1.

At a prescribed position, for example, of the rear surface of case 201A, external connectors 207 and 208 to be connected to a network as well as power connector 209 for receiving electric power are provided. External connectors 207 and 208 are connectors corresponding to a cable transmission interface and to an optical cable transmission interface, respectively. Although not being shown in the figure, a sending/receiving antenna corresponding to a transmission interface for a wireless local area network (hereinafter referred to as "LAN") is provided on a prescribed position of case 201A. Picture transmission unit 200-1 is connected to a network via external connectors 207 and 208 or the sending/receiving antenna, and is further connected to a computer etc. at the receiving side.

Within case 101A of video camera unit 100-1 shown in FIG. 2, first photoelectric conversion means (for example, a charge coupled device, hereinafter referred to as "CCD") 109 is provided, and picture signal producing means 110 is connected to the output side of this CCD 109. Picture signal producing means 110 is a device which converts an electric signal for the first optical image taken into picture signal S110 in NTSC (National Television System Committee) format. The output side of picture signal producing means 110 is connected to a prescribed terminal of connector 107a.

Microphone 103 fitted to case 101A is connected to a prescribed terminal of connector 107a via amplifier 120.

Amplifier 120 is a circuit, which amplifies an analog signal outputted from microphone 103 to a prescribed level and outputs first analog audio signal S120 to connector 107a. To a prescribed terminal of connector 107b is connected speaker 104 via amplifier 130, and is connected camera control means 140. Amplifier 130 is a circuit, which amplifies second analog signal S260 given from connector 107 to a prescribed level and gives it to speaker 104. Camera control means 104 is a device, which adjusts focus and zooming of lens system 102A and controls camera angle, brightness of image, and the like according to control signal S270 given from connector 107b.

Figure 2:
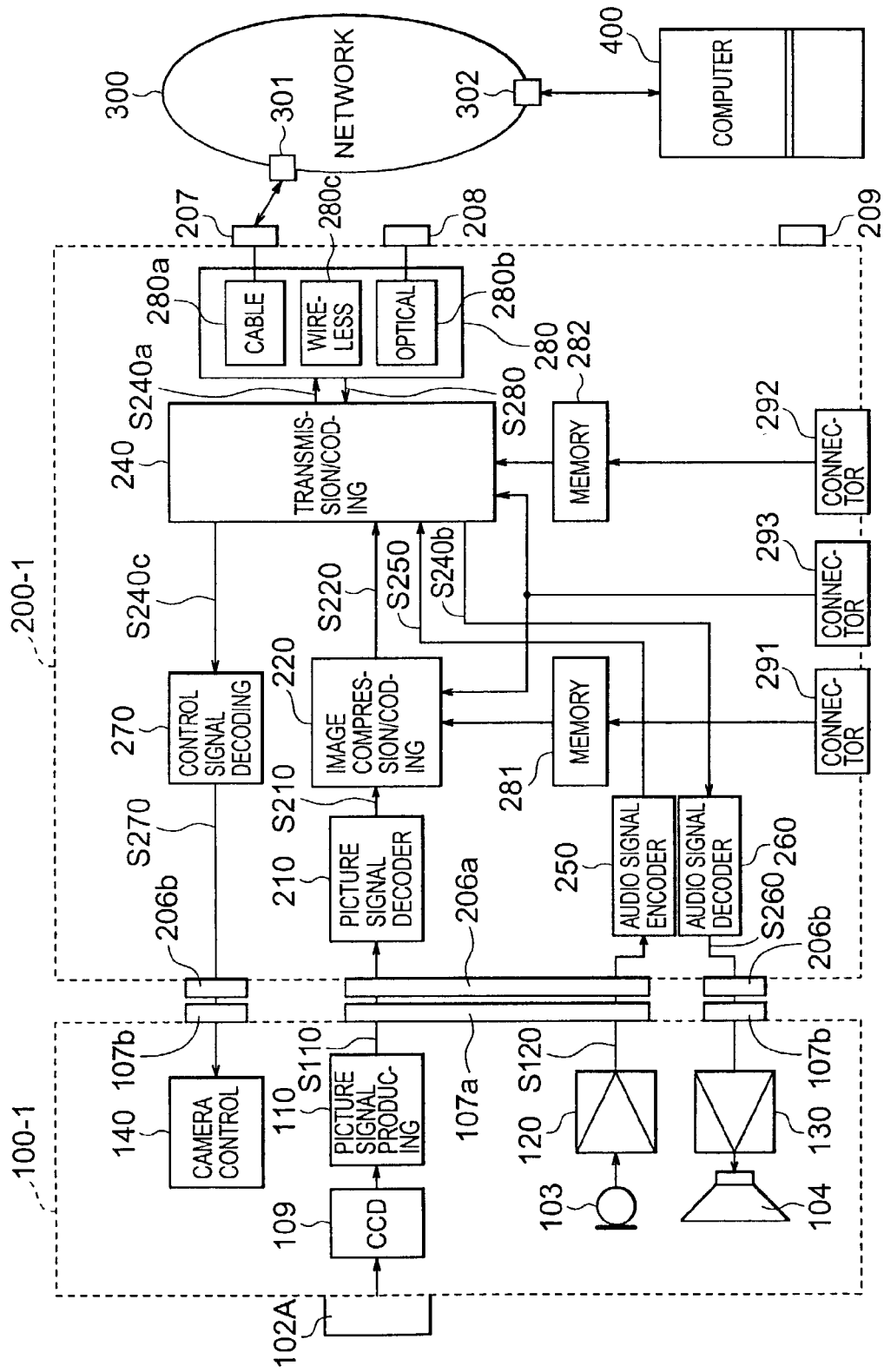
FIG. 2 is a block diagram showing the inner configuration of the picture transmission system of FIG. 1.

Within case 201A of picture transmission unit 200-1 shown in FIG. 2, compression/coding means connected to a prescribed terminal of connector 206a is provided. The compression/coding means is a device, which converts picture signal S110 with an NTSC format outputted from video camera unit 100-1 or 100-2 into compressed picture signal S220 according to a prescribed coding format, and outputs it, and is composed of, for example, picture signal decoder 210 and image compression/coding means 220. Picture signal decoder 210, whose input side is connected to a prescribed terminal of connector 206a, is a device for converting picture signal S110 given from connector 206a into digital image signal S210. Image compression/coding means 220 is connected to the output side of picture signal decoder 210.

Image compression/coding means 220 is a device, which inputs digital image signal S210, compresses and codes signal S210 according a preset coding format, and outputs compressed picture signal S220. Transmission/coding means 240 is connected to the output side of image compression/coding means 220.

Transmission/coding means 240 has a function that it inputs compressed image signal S220 compressed and coded by image compression/coding means 220, packet-multiplexes signals S220 and S250 according to a prescribed manner, and first compressed digital audio signal S250, and outputs first coded signal S240a according to a prescribed communication protocol. Furthermore, transmission/coding means 240 also has a function that it receives second coded signal S280 having been multiplexed according to a prescribed communication protocol, and separates signal S280 into second compressed digital audio signal S240b and transmission control signal S240c according to a prescribed manner and outputs them.

Transmission/coding means 240 is connected to the output side of audio signal encoder 250, to the input side of audio signal decoding means (such as audio signal decoder) 260, to the input side of control signal decoding means 270, and to the input and output sides of interface (hereinafter referred to as "I/F") means 280. An aural signal codec is composed of audio signal encoder 250 and audio signal decoder 260.

Audio signal-encoder 250 whose input side is connected to a prescribed terminal of connector 206a has a function that it compresses and encodes first analog audio signal S120 inputted from this terminal and output first compressed digital audio signal S250 to transmission/coding means 240. Audio signal decoder 260 whose output side is connected to a prescribed terminal of connector 206b has a function that it inputs second compressed digital audio signal S240b outputted from transmission/coding means 240, and expands and decodes this signal S240b to output second analog audio signal S260 to connector 206b.

Control signal decoding means 270 whose output side is connected to a prescribed terminal of connector 206b has a function that it inputs transmission control signal S240c outputted from transmission/coding means 240, and decodes this signal S240c to output control signal S270 to connector 206b.

I/F means 280 possesses, for example, cable I/F 280a for cable transmission, optical I/F 280b for optical cable transmission, and wireless I/F 280c for wireless LAN transmission, and these cable I/F 280a and optical I/F 280b are connected to external connectors 207, and 208, respectively. External connector 207 is connected to network 300, for example, via hub 301. For example, computer 400 at the receiving side is connected to this network 300 via hub 302. I/F means 280 has a function that it converts first coded signal S240a coded by transmission/coding means 240 into a signal corresponding to a transmission medium constructing network 300 and outputs it to external connector 207 and a function that it receives second coded signal S280 transmitted from network 300 and outputs it to transmission/coding means 240.

Image compression/coding means 220 and transmission/coding means 240 are, for example, DSP and FPLA, respectively. DSP is a device, which executes signal processing following a program with a procedure stored in a memory, and FPLA is a logic circuit which can execute a prescribed logic calculation by setting logic conditions.

To image compression/coding means 220 and transmission/coding means 240, rewritable nonvolatile memories 281 and 282 are connected, respectively. Rewritable nonvolatile memories 281 and 282 are, for example, composed of an erasable programmable read only memory (EPROM), which is erasable through ultraviolet ray, etc., an electrically erasable and programmable ROM (EEPROM), a flash memory, a ferroelectric random access memory (FeRAM), or the like. In order to execute rewriting as occasion demands, connectors 291 and 292 for the connection to a jig for rewriting a memory are connected to these memories 281 and 282. Optionally, to image compression/coding means 220 and transmission/coding means 240, connectors 293 for the connection to a jig for setting logic conditions are connected in order to set the first and second logic conditions for FPLA.

Figure 3:
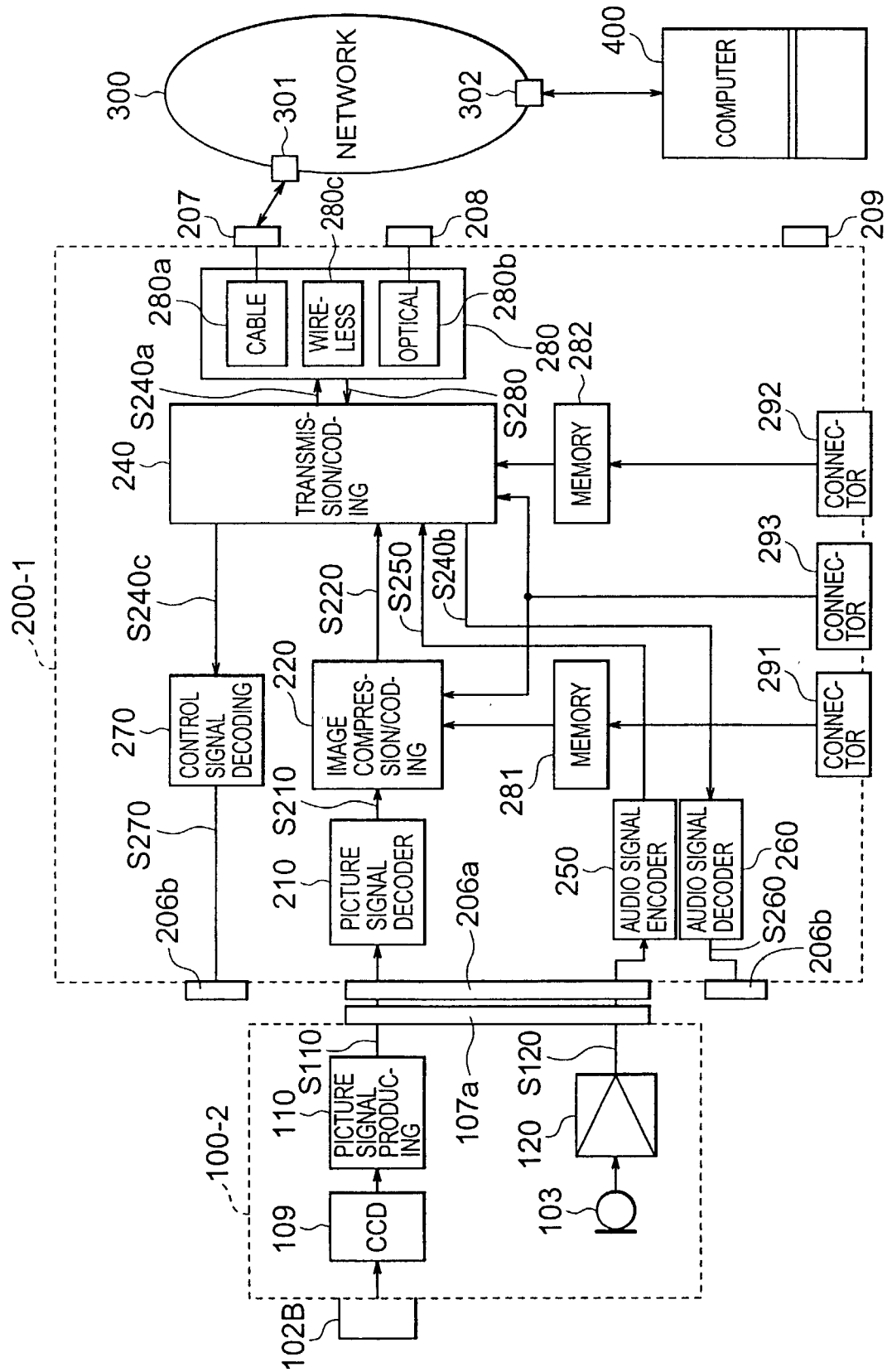
FIG. 3 is a block diagram showing the inner configuration of the picture transmission system of FIG. 1.

Similar to the side of video camera unit 100-1, CCD 109, which converts the second optical image taken by second lens system 102B into an electric signal is provided within case 101B of video camera unit 100-2 shown in FIG. 3. CCD 109 is connected to a prescribed terminal of connector 107a via second picture signal producing means 110. Picture signal producing means 110 is a device, which converts an electric signal for the second optical image having been taken into picture signal S110 in NTSC, and outputs it to connector 107a.

Similar to the side of video camera unit 100-1, microphone 103 fitted to case 101B is connected to a prescribed terminal of connector 107a via amplifier 120. Amplifier 120 is a circuit, which amplifies an analog audio signal outputted from microphone 103 to a prescribed level and outputs second analog audio signal S120 to connector 107a.

Figure 4:
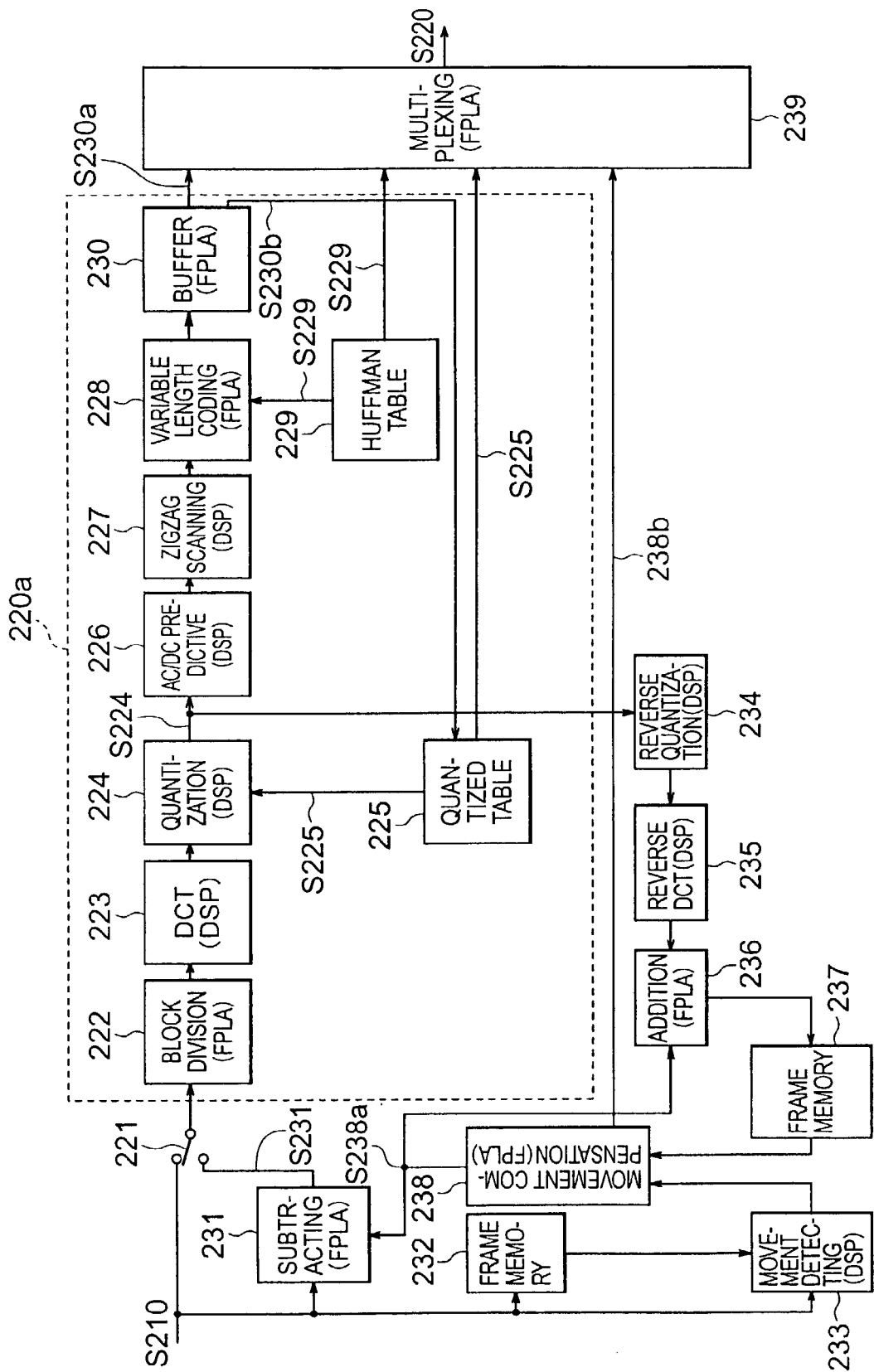
FIG. 4 shows a configuration of functions showing one example of an image compression/coding means of FIG. 2 or 3.

In image compression/coding means 220 shown in FIG. 4, the functions of DSP and of FPLA are schematically shown when image compression/coding means 220 is set to a coding format of MPEG (Motion Picture Expert Group)-4, which is commonly used in motion picture transmission through internet or such. In practice, according to the coding program for DSP stored in memory 281 and the first logic conditions set in FPLA, processing in each part is sequentially executed.

As shown in FIG. 4, image compression/coding means 220 possesses switch 221 into which digital image signal S210 is inputted from the first input side and subtracting portion 231. Subtracting portion 231 has a function, which calculates difference S231 per image between previous image S238a and actually inputted digital image signal S210, and the output side of this subtracting portion 221 is connected to a second input side of switch 221. Switch 221 has a function that inputted digital image signal S210 and differences S231 outputted from subtracting portion 231 are switched at a prescribed ratio (for example, differences per one image signal; where n is an positive integer) to give it to block division portion 222.

Block division portion 222 has a function that an image signal is divided into a block group, for example, 8 picture elements in the horizontal direction and 8 picture elements in the vertical direction, and the output side thereof is connected to discrete cosine transform (hereinafter referred to as "DCT") portion 223. DCT portion 223 has a function that a picture component within the block per each image block resolves into frequency components from direct current (herein after referred to as "DC") to alternating current (hereinafter referred to as "AC") with high frequency by DCT to convert it into an expression of frequency region. Quantization portion 224 is connected to DCT portion 223.

Quantization portion 224 has a function that according to quantized value S225 of quantized table 225 read by bit rate S230b, each component is quantized to produce DCT coefficient S224. Quantized value S225 of quantized table 225 is set so that using the fact that human visual sensitivity is weak against AC component, DCT coefficient S224 at a high frequency region is quantized in a relatively coarse manner. AC/DC predictive portion 226 is connected to quantization portion 224.

AC/DC predictive portion 226 has a function that DC coefficient of block just before is used as a predictive value and difference between DC coefficient within DCT coefficient S224 and the predictive value is coded. Zigzag scanning portion 227 is connected to AC/DC predictive portion 226. Zigzag scanning portion 227 has a function that AC coefficient within DCT coefficient S224 is scanned in a zigzag manner to thereby rearrange AC coefficient. Variable length coding portion 228 is connected to zigzag scanning portion 227.

Variable length coding portion 228 has a function that by referring to Huffman table value S229 of Huffman table 229, arrangement having a large occurrence frequency within data is corresponded to code having a small bit, whereby total number of codes can be reduced. To the output side of variable length coding portion 228, multiplexing portion 239 is connected via buffer 230 for outputting data S230a and bit rate S230b.

Inputted digital image signal S210 is stored in frame memory 232, so that from the content of frame memory 232 and inputted digital image signal S210, the change in the movement of inputted digital image signal S210 is detected by movement detecting portion 233.

Reverse quantization portion 234 is connected to quantization portion 224. Reverse quantization portion 234 has a function that by multiplying DCT coefficient S224 by quantized table value S225, the value is returned to each component of AC and DC. Reverse quantization portion 234 is connected to reverse DCT portion 235. Reverse DCT portion 235 has a function that each value of components AC and DC expressed in the frequency region is returned to the image component within the block per each image block. The image component within the block produced in reverse DCT portion 235 is given to addition portion 236.

Predictive image S238a is further given to addition portion 236 so that the result of the addition by addition portion 236 is stored in frame memory 237. The change in the movement of inputted digital image signal S210 is detected by movement detecting portion 233, and the result of the detection is given to movement compensation portion 238. Movement compensation portion 238 is configured so as to input the result of the detection by the movement detection portion 233 and the content of frame memory 237, and to output predicted image S238a and coded movement information S238b, whereby predicted image S238a is given to subtracting portion 231 and addition portion 236.

Coded movement information S238b, quantized table value S225 of quantized table 225, Huffman table value S229 of Huffman table 229, and data S230a of buffer 230 are given to multiplexing portion 239, at which compressed picture signal S220 having been compressed and coded is produced and outputted.

In such image compression/coding means 220-1, DCT portion 223, quantization portion 224, AC/DC predictive portion 226, zigzag scanning portion 227, movement detecting portion 233, reverse quantization portion 234, and reverse DCT portion 235 are constructed by using DSP. Also, block division portion 222, variable length coding portion 228, buffer 230, subtracting portion 231, movement compensation portion 238, addition portion 236, and multiplexing portion 239 are constructed by using FPLA.

In image compression/coding means 220 shown in FIG. 4, DSP and FPLA are configured so as to carry out compression coding according to MPEG-4 format. However, it should be noted that, for example, if texture coding portion 220a circled by broken line in this figure, i.e., from block division portion 222 to buffer 230, is composed of DSP and FPLA, compression coding according to JPEG (Joint Photographic Expert Group) format, which is commonly used in static image can be carried out.

Similarly, transmission/coding means 240 shown in FIGS. 2 and 3 may also be composed of DSP and FPLA to be accorded with various communication protocol and transmission rates, etc.

Compression coding of audio signal using audio signal encoder 250 shown in FIG. 5 will now be described.

In digital communication where an analog signal is converted into digital signal, which is then transmitted, the fact that a signal waveform is sampled, quantized, and coded to express it in digital is referred to waveform coding. Typical example of waveform coding in the digital communication of audio signal includes PCM (Pulse Code Modulation) manner, in addition to other manners such as deferential PCM (DPCM) manner, adaptive DPCM (ADPCM) and the like. In PCM, a waveform, which is analog, is sampled at a frequency capable of decoding, and the amplitude thereof is quantized to be expressed as a binary code. In DPCM, in order to reduce the amount of information as small as possible, a difference between neighboring amplitudes is taken to be coded. In case of DPCM, if there exists a quantizing error, quantization distortion between the signal at the sending and receiving sides is accumulated.

In order to prevent this, in ADPCM, adaptive quantization principal is taken into DPCM to provide, on an encoder at the sending side, the same adaptive reverse quantization circuit as that of the decoder at the receiving side, whereby accumulation of quantization distortion is prevented.

Specifically, as static properties of audio signal waveform, correlation between sample values is large, and there are a small (instantaneous) change per a sample value and slow and large change (average) based on pitch construction or syllable construction in changing of amplitudes. As the correlation becomes larger, the dynamic range of the signal due to the difference can be largely compressed, making it possible to compress an average power. If the adaptation to the change in the amplitudes of audio signal is adapted by two portions; autoregression predictive portion (instant prediction) and moving average predictive portion (average prediction), the effect can be further enhanced. Such an audio signal coding is called ADPCM, which has the features that audio in telephone quality can be obtained, the amount of calculation can be reduced, it is advantageous for transmission error, and the frame length is short.

Figure 5:
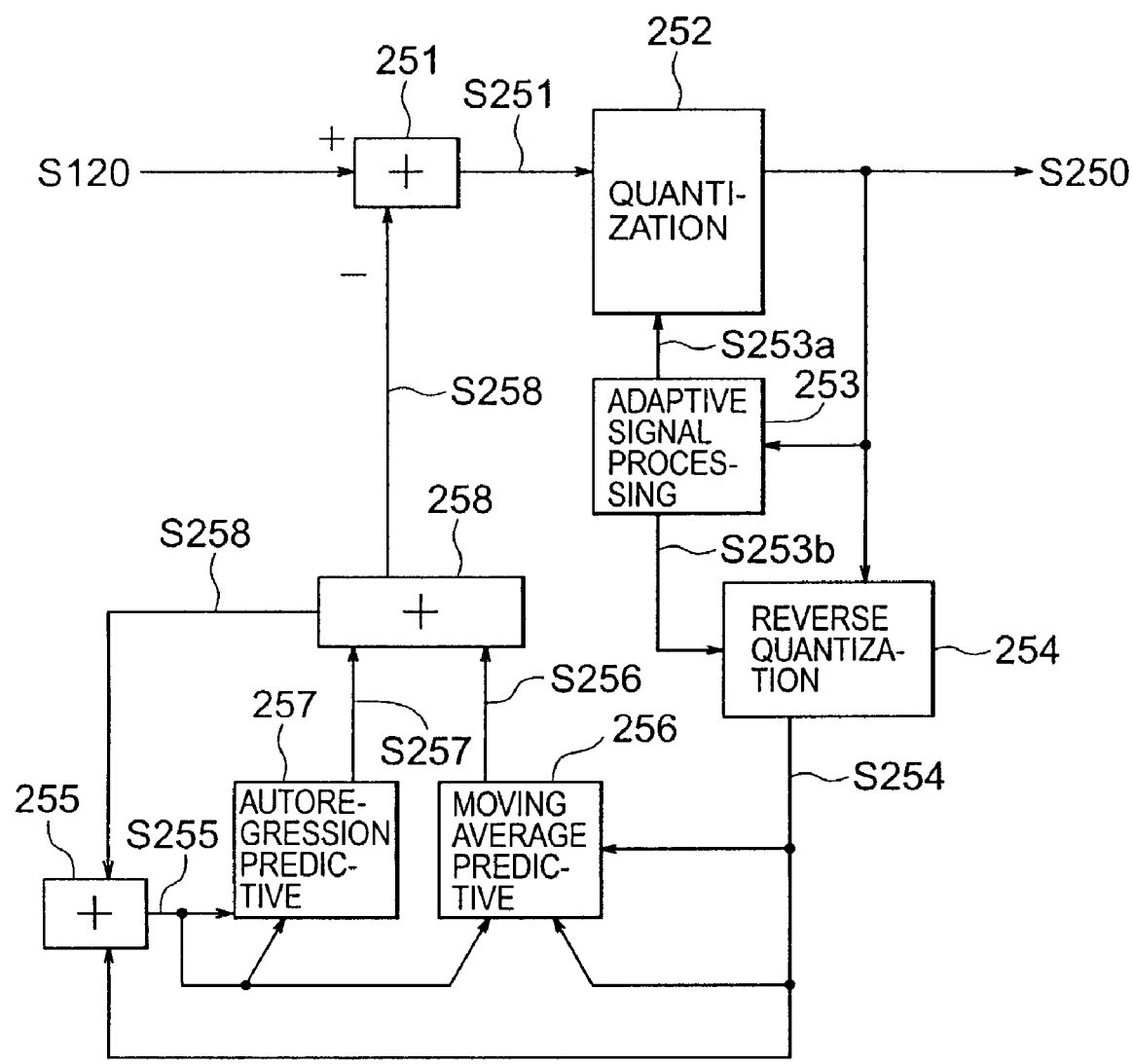
FIG. 5 shows a configuration of functions showing one example of an audio signal encoder of FIG. 2 or 3.

For this reason, in audio signal encoder 250 shown in FIG. 5 has a configuration that first analog audio signal S120 is compressed and coded according to ADPCM to output first compressed digital audio signal S250.

Audio signal encoder 250 has subtracting portion 251 at which predictive signal S258 is subtracted from first analog audio signal S120 to thereby output subtracted signal S251. Quantization portion 252 is connected to the output side of subtracting portion 251. Quantization portion 252 has a function that subtracted signal S251 is quantized based on quantized step width S253a to output first compressed digital audio signal S250, and adaptive signal processing portion 253 and reverse quantization portion 254 are connected to the output side of this quantization portion 252. Adaptive signal processing portion 253 has a function that first compressed digital audio signal S250 is adaptively processed to output quntized step width S253a and reverse quntized step width S253b, quntized step width S253a is given to quantization portion 252, and reverse quntized step width S253b is given to reverse quantization portion 254. As described above, the feedback circuit of the encoder possesses a decoding circuit, whereby the accumulation of quantization distortion is prevented.

Reverse quantization portion 254 has a function that compressed digital audio signal S250 is reverse qauntized based on reverse quantization step width S253b and outputs output signal S254, and addition portion 255 and moving average predictive portion 256 are connected to the output side thereof. Addition portion 255 has a function that it adds output signal S254 to predictive signal S258 to output addition signal S255, and moving average predictive portion 256 and autoregression predictive portion 257 are connected to the output side thereof.

Moving average predictive portion 256 has a function that it inputs output signal S254 and addition signal S255 to predict a slow and large change in amplitudes from the past input to output predicted signal S256, and addition portion 258 is connected to the output side thereof. Autoregression predictive portion 257 has a function that addition signal S255 is inputted, and make a prediction from the previous sample value to immediately output detail predicted signal S257, and addition portion 258 is connected to the output side thereof. Addition portion 258 has a function that predicted signals S256 and S257 are inputted to output predicted signal S258, and subtracting portion 251 is connected to the output side thereof.

In this audio signal decoder 250, when first analog audio signal S120 is inputted, predicted signal S258 predicted from past inputting is subtracted by subtracting portion 251. Subtracted signal S251 in subtracting portion 251 is quantized based on adapted quantized step width S253a in quantization portion 252. At this time, the result of the quantization by. quantized step width S253a is controlled to be positioned at approximately center of allowable level in terms of absolute value so as not to be in the state where it resides near the upper limit of the allowable level (gradient loading state) and not to be in the state where it resides near the lower limit of the allowable level (noise state due to particle). Then, first compressed digital audio signal S250 having been compressed and coded is outputted from quantization portion 252.

Next, setting (A) and operation (B) of picture transmission system shown in FIGS. 1 to 5 will be described.

(A) Setting of Picture Transmission System:

First, for example, video camera unit 100-1 or 100-2 is selected amongst a plurality kind of video camera units to meet the intended purpose of the picture transmission system. Specifically, considering the purpose of taking picture, image quality required, cost, which can be paid and the like, a low quality camera unit, a middle quality camera unit, a high quality camera unit, or a camera unit for a special application is selected. For example, an infrared camera unit may be selected to be used as an extravisual sensing camera unit.

Also, corresponding to the specification of network 300 used as transmission passage and that of commuter 400 at the receiving side, the operation environments such as compression coding format for image, a type of network 300, a transmission rate, and a communication protocol are selected.

Examples of compression coding formats include MPEG-2, which has been used in digital telecast in addition to JPEG and MPEG-4 mentioned previously. As the transmission mediums, which constructs network 300, a cable, an optical cable, and a wireless can be mentioned as descried above. Examples of transmission rates include 54 kbps corresponding to a modem for telephone network, 64 kbps corresponding to narrow band ISDN (Integrated Service Digital Network), 10 Mbps for 10 Base LAN, and 100 Mbps for 100 Base LAN, and the like. Also, examples of communication protocols include TCP/IP (Transmission Control Protocol/Internet Protocol), UDP/IP (User Datagram Protocol/Internet Protocol), and the like.

Subsequently, corresponding to the operation environments selected, a previously prepared program for DSP and setting information for FPLA are ready.

Furthermore, jigs for rewriting memory are connected to connectors 291 and 292 of picture transmission unit 200-1, a coding program with a procedure corresponding to a prescribed coding format is stored in memory 281 and a communication program is stored in memory 282. Also, a jig for setting logic conditions of FPLA is connected to connector 293 to set the first logic conditions to FPLA within image compression/coding means 220 and the second logic conditions to FPLA within transmission/coding means.

After the setting of operation environments has been completed as described above, a bottom surface of the selected video camera unit, for example, video camera unit 100-1 is placed on fulcrum 202 of picture transmission unit 200-1, and is subjected to be slid within the groove. The conjugation position can be precisely determined by guide pin 105 at the side of video camera unit 100-1 and guide pin holder 203 at the side of picture transmission unit 200-1. Furthermore, connectors 107a and 107a of video camera unit 100-1 are inserted into connectors 206a and 206b of picture transmission unit 200-1 or vice versa, and by means of lock pins 106a and 106b and lock pin holders 204a and 204b, video camera unit 100-1 and picture transmission unit 200-1 are conjugated and fixed with each other. Video camera unit 100-1 and picture transmission unit 200-1 may be separated from each other, by pulling them apart while pushing lock release button 205 at the side of picture transmission unit 200-1.

After video camera unit 100-1 and picture transmission unit 200-1 are combined, video camera unit 100-1 is set at a prescribed position in order to take pictures within monitoring area, and connection to a power source, network and the like will be carried out.

(B) Operation of Picture Transmission System:

In video camera unit 100-1, an optical image taken by lens system 102A is converted into an electric signal by CCD 109, and picture signal S110 in an NTSC format is produced by picture signal producing means 110. Picture signal S110 is transmitted to picture signal decoder 210 at the side of picture transmission unit 200-1 via connectors 107a and 206a, and is converted into digital picture signal S210 by this picture signal decoder 210, which is then given to image compression/coding means 220.

Digital picture signal S210 is compressed and coded in a prescribed coding format within image compression/coding means 220 according to the coding program store in memory 281 to produce compressed picture signal S220, which is then given to transmission/coding means 240.

On the other hand, audio signal collected from microphone 103 at the side of video camera unit 100-1 is amplified to a prescribed level by amplifier 120 to produce first analog audio signal S120, which is transmitted to audio signal decoder 260 at the side of picture transmission unit 200-1 via connectors 107a and 206a. Analog audio signal S120 is compressed and coded by audio signal encoder 250, and then given to transmission/coding means 240.

In transmission/coding means 240, compressed picture signal S220 and compressed digital audio signal S250 are packet-multiplexed as a transmission signal based on a communication program stored in memory 282 to thereby produce first coded signal S240a, which is outputted to I/F means 280 according to a prescribed communication protocol.

Within I/F means 280, first coded signal S240a is converted into a cable, wireless or optical signal corresponding to transmission medium making up network 300, and then transmitted to computer 400 at the receiving side via this network 300.

On the other hand, the control signal and audio signal for controlling video camera unit 100-1 outputted from computer 400 at the receiving side are packet-multiplexed to be converted into second coded signal S280, which is sent to picture transmission unit 200-1 via network 300. Second coded signal S280 having been sent is received by I/F means 280, and given to transmission/coding means 240 at which it is separated into second compressed digital audio signal S240b and transmission control signal S240c. Second compressed digital audio signal S240b is expanded and decoded by audio signal decoder 260 to be converted into second analog audio signal S260, which is sent to video camera unit 100-1 via connectors 206b and 107b. Analog audio signal S260 having been sent is amplified by amplifier 130, and then outputted from speaker 104.

Transmission control signal S240c outputted from transmission/coding means 240 is decoded by control signal decoding means 270 to be converted into control signal S270, which is sent to video camera unit 100-1 via connector 206b and 107b. Control signal S270 having been sent is given to camera control means 140 to perform control of lens system 102A and the like.

As described above, the first embodiment of the present invention has the following advantages (1) to (3):

(1) The picture transmission system shown in FIGS. 1 to 3 is composed of an individual video camera unit 100-1 or 100-2 in combination with common picture transmission unit 200-1. For this reason, for example, when simplified type video camera unit 100-2 is altered to a high performance video camera unit 100-1, picture transmission unit 200-1 can be commonly used and, therefore, only video camera unit 100-1 may be newly prepared. This makes it possible to enhance functions with low cost.

(2) Image compression/coding means 220 and transmission/coding means 240 in picture transmission unit 200-1 are, for example, constructed by using DSP and FPLA, and the program of DSP and logic conditions of FPLA are set so as to meet a prescribed coding format and communication protocol, etc. This can easily realize picture transmission system having functions to meet an intended purpose without changing hardware.

Figure 6:
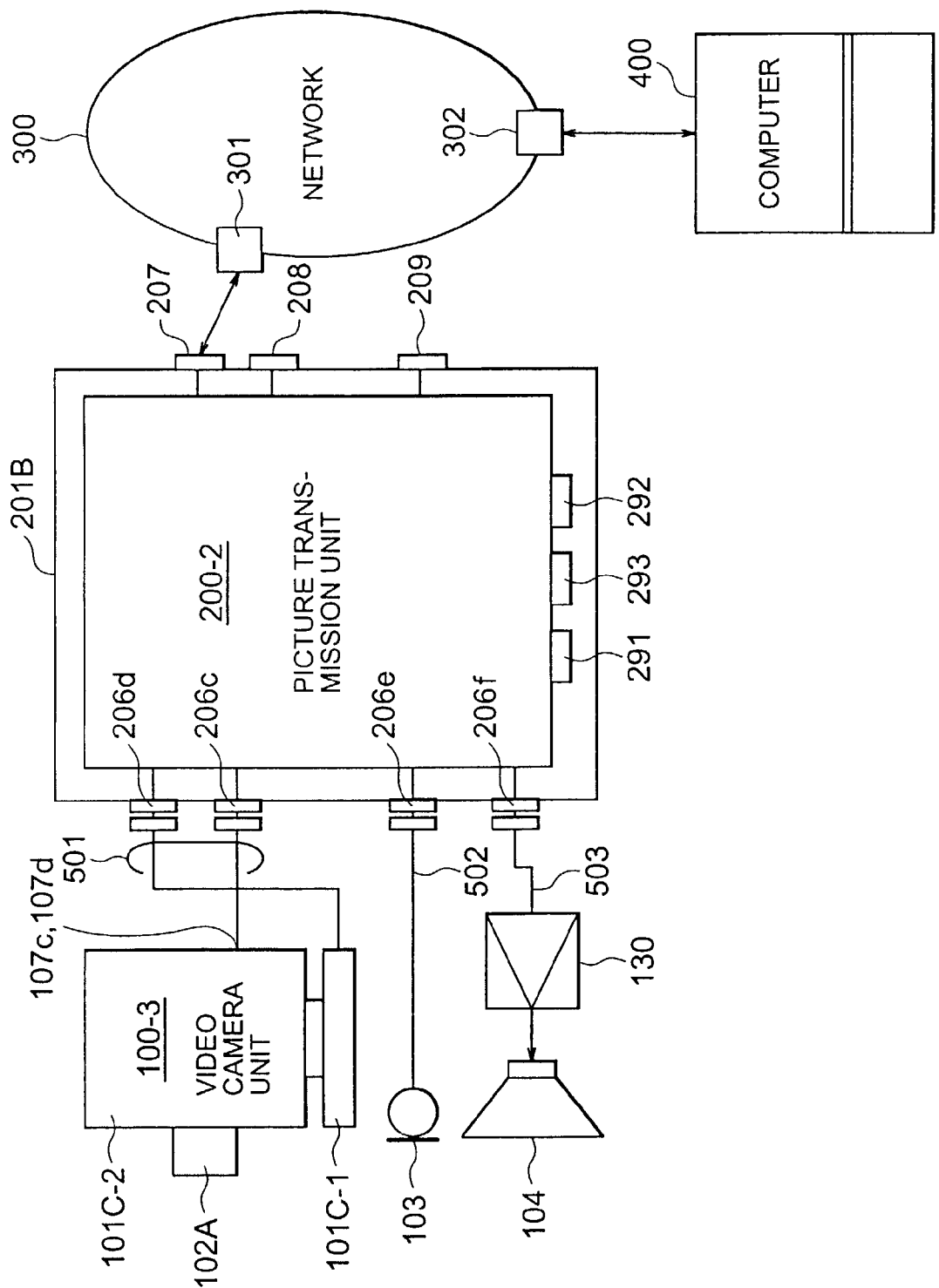
FIG. 6 shows a configuration of a picture transmission system according to the second preferred embodiment of the present invention.
Figure 7:
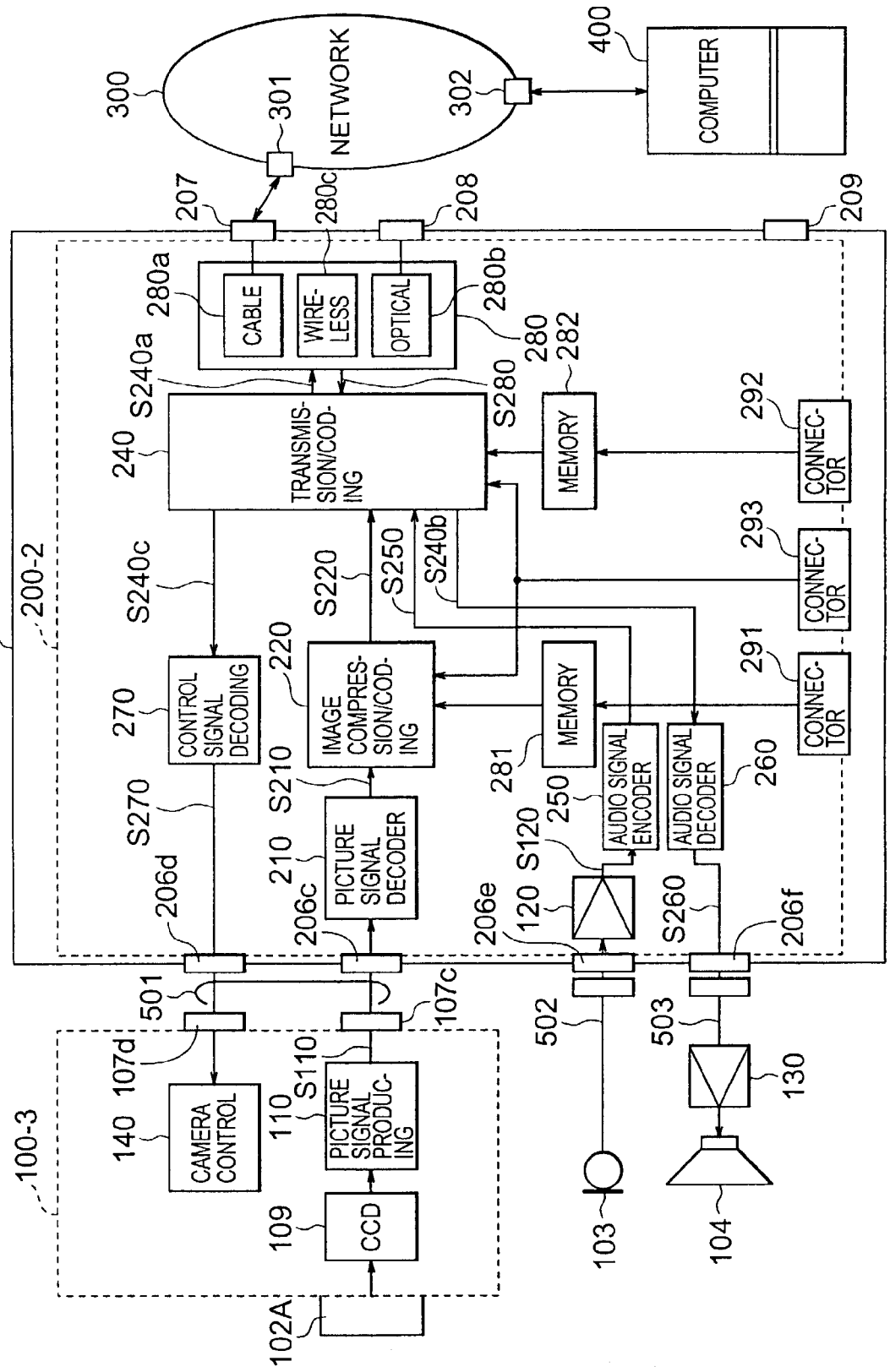
FIG. 7 is a block diagram showing the inner configuration of the picture transmission system of FIG. 6.

(3) Since a maker may produce only one type of picture transmission unit 200-1 and may set a prescribed coding format, etc. to meet the requirement, the inventory adjustment can be made easer and the appointed date for delivery can be shortened Second Embodiment (FIGS. 6 and 7)

In FIGS. 6 and 7, which show the second embodiment of the picture transmission system according to the present invention, elements common to those in FIGS. 1 and 2 refer to the same symbols or numbers.

In this picture transmission system, microphone 103 is provided outside of, for example, first video camera unit 100-3 amongst a plurality kind of video camera units. Also, speaker 104 and amplifier 130 accommodated with in a box or such are provided. Further, first video camera unit 100-3, microphone 103 and amplifier 130 at the side of speaker 104 are connected to picture transmission unit 200-2 via cables 501, 502, and 503, each having a detachable connector.

Specifically, substantially similar to video camera unit 100-1 shown in FIGS. 1 and 2, first video camera unit 100-3 is a high function apparatus, which can adjust focus and zooming of lens and control camera angle, brightness of image, and the like by remote control, and possesses camera platform 101C-1 which changes the camera angle by a motor or such. Case 101C-2 is rotatably provided on an upper portion of camera platform 101C-1 so that the camera angle can be changed. Lens system 102A similar to that shown in FIGS. 1 and 2 is provided on a front surface of case 101C-2. On prescribed positions of case 101C-2, for example, the rear surface thereof, terminals 107c and 107d for connecting a cable are fitted.

Within case 101C-2, CCD 109, picture signal producing means 110, camera control means 140, and the like similar to FIG. 2 are provided. CCD 109 is an element which converts first optical image taken by lens system 120A into an electric signal, and the output side thereof is connected to terminal 107c via picture signal producing means 110. Camera control means 140 is a control device, which adjusts focus and zooming, controls brightness of image, and revolves case 101C-2 on camera platform 101C-1 to control the camera angle according to control signal S270 given from terminal 107d.

Video camera unit 200-2 possesses case 201B, which accommodates the body of the unit. On prescribed positions of case 201B, for example, the front surface thereof, terminals for connecting a cable 206c, 206d, 206e, and 206f are provided. Also, external connectors 207 and 208, and a power connector 209 are provided on the rear surface of case 201B similar to those in FIGS. 1 and 2.

Within case 201B, connectors 291, 292, and 293 similar to those in FIGS. 1 and 2, as well as amplifier 120 at the side of microphone 103 similar to that in FIGS. 1 and 2, picture signal decoder 210, image compression/coding means 220, transmission/coding means 240, audio signal encoder 250, picture signal decoder 260, control signal decoding means 270, I/F means 280, and nonvolatile memories 281 and 282 are provide.

Terminal 206c is connected to the input side of picture signal decoder 210. Terminal 206d is connected to the input side of control signal decoding means 270. Terminal 206e is connected to the input side of audio signal encoder 250 via amplifier 120. Terminal 206f is connected to the output side of audio signal decoder 260.

Terminals 107c and 107d at the side of video camera unit 100-3 and terminals 206c and 206d at the side of picture transmission unit 200-2 are connected with each other by cable 501 with a detachable connector. Microphone 103 is connected to terminal 206e via cable 502 with a detachable connector. To terminal 206f is connected the input side of amplifier 130 at the side of speaker 104 accommodated within a box, or such via cable 503 with a detachable connector.

The picture transmission system according to the second embodiment can exhibit substantially the same functions and advantages as those of the picture transmission system shown in FIG. 2. In addition, since the picture transmission system of the second embodiment is configured so that video camera unit 100-3, microphone 103 and amplifier 130 at the side of speaker 104 accommodated within a box, etc. can be detachably connected to terminals 206c to 206f of picture transmission unit 200-2 via cables 501–503 with a connector, it can easily be produced and assembled. What is more, they can easily be replaced with any other video camera unit, microphone, or a speaker. If not be used, microphone 103 and speaker 104 may not be connected to video camera unit 200-2.

Further, amplifier 120 at the side of microphone 103 may be built in microphone 103. Also, amplifier 130 at the side of speaker 104 may be provided within picture transmission unit 200-2.

Figure 8:
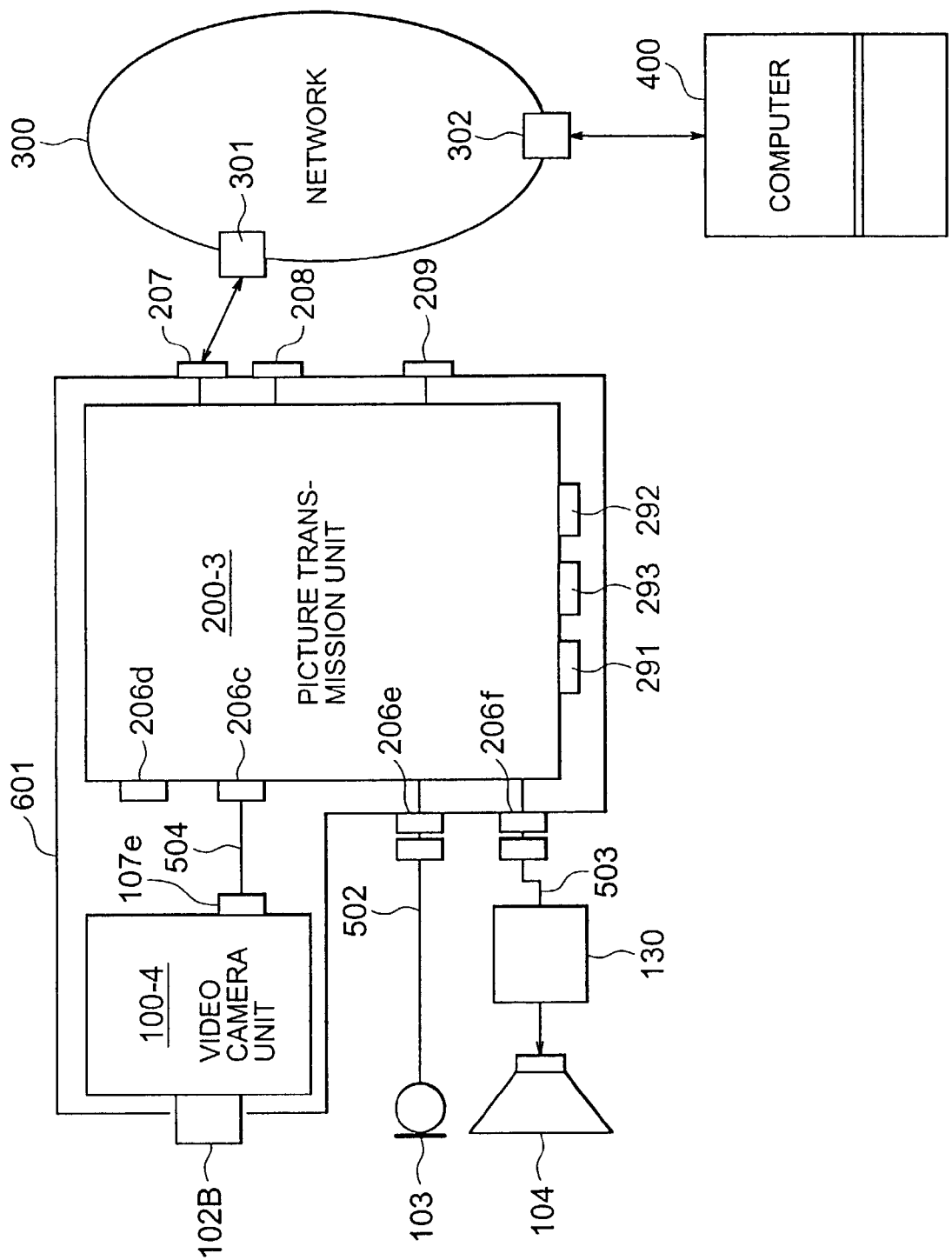
FIG. 8 shows a configuration of a picture transmission system according to the third preferred embodiment of the present invention.
Figure 9:
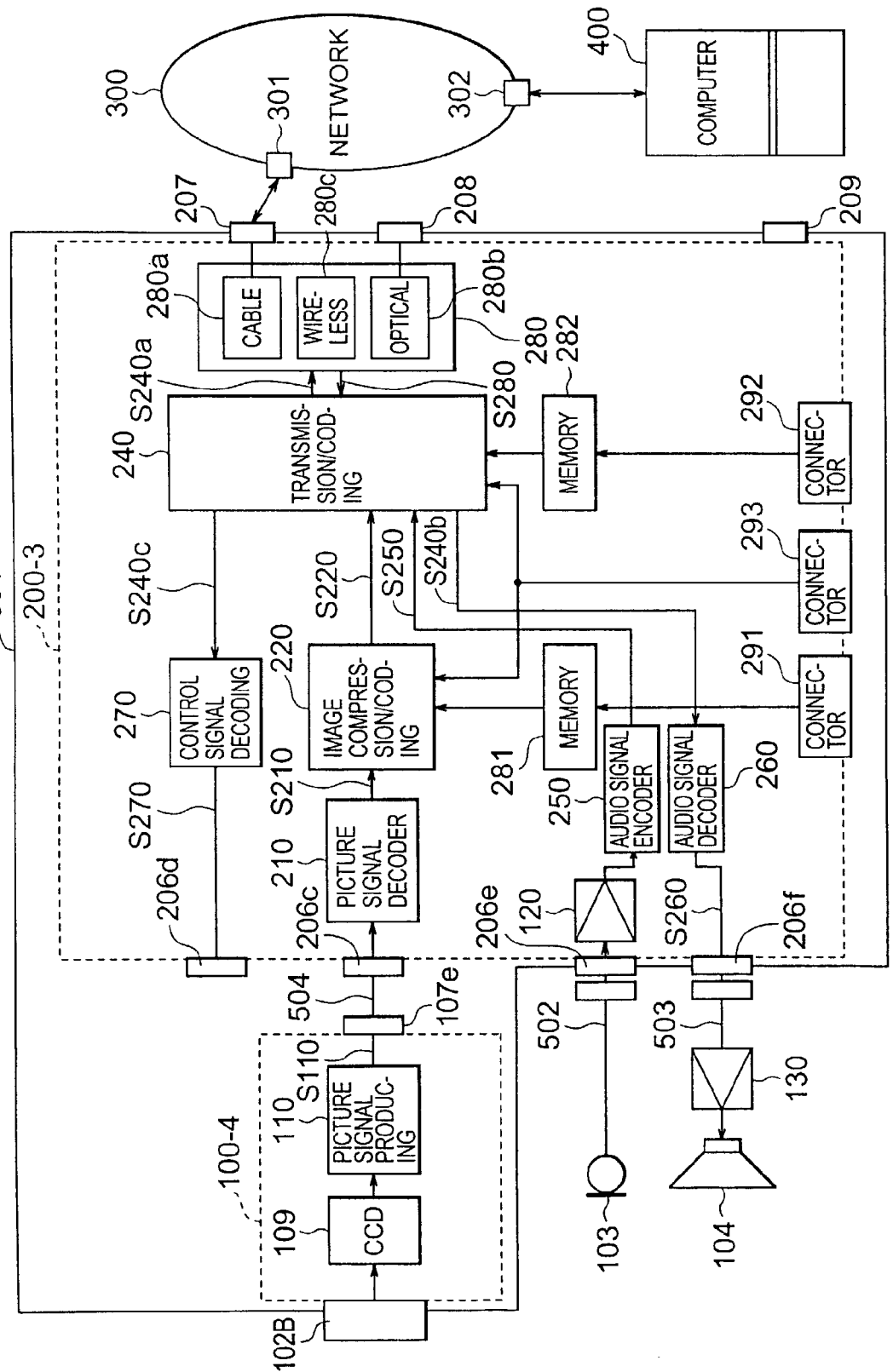
FIG. 9 is a block diagram showing the inner configuration of the picture transmission system of FIG. 8.

Third Embodiment (FIGS. 8 and 9)

In FIGS. 8 and 9, which show the third embodiment of the picture transmission system according to the present invention, elements common to the first embodiment shown in FIGS. 1 and 2 and the second embodiment shown in FIGS. 6 and 7 refer to the same symbols or numbers.

In this picture transmission system, for example, second video camera unit 100-4 amongst a plurality kind of video camera units and picture transmission unit 200-3 are accommodated within case 601, microphone 103 is provided outside of this case 601 and speaker 104 and amplifier 130 accommodated within a box or such are provided.

Specifically, substantially similar to video camera unit 100-2 shown in FIGS. 1 and 3, second video camera unit 100-4 is a simplified device where focus of the lens is fixed and second lens system 102B is provided. Terminal 107e for connecting a cable is provided on video camera unit 100-4, and CCD 109 and picture signal producing means 110 similar to those in FIG. 3 are connected between terminal 107e and lens system 102B. Video camera unit 100-4 is fitted within the front side of case 601, for example, in a detachable manner.

Substantially similar to FIGS. 6 and 7, picture transmission unit 200-3 possesses terminals 206c–206f, external connectors 207 and 208, power connector 209, connectors 291–293, amplifier 120 at the side of microphone 103, picture signal decoder 210, image compression/coding means 220, transmission/coding means 240, audio signal encoder 250, audio signal decoder 260, control signal decoding means 270, I/F means 280, and nonvolatile memories 281 and 282 are provide. Picture transmission unit 200-3 is fitted within case 601 at the rear side of video camera unit 100-4. Terminal 107e at the side of video camera unit 100-4 and terminal 206c at the side of picture transmission unit 200-3 are connected with each other by a cable 504 with a detachable connector.

Microphone 103 provided outside of case 601 is connected to terminal 206e at the side of picture transmission unit 200-3 via cable 502 with a detachable cable. Amplifier 130 at the side of accommodated within a box or such is connected to terminal 206f at the side of picture transmission unit 200-3 via cable 503 with a detachable cable.

The picture transmission system according to the third embodiment can exhibit substantially the same functions and advantages as those of the picture transmission system shown in FIG. 3. In addition, since the picture transmission system of the third embodiment is configured so that video camera unit 100-4 and picture transmission unit 200-3 are accommodated within case 601, and these video camera unit 100-4 and picture transmission unit 200-3 are connected to each other via cable 504 with a detachable connector, it can easily be produced and assembled, and a small size picture transmission system can be realized. If not be used, microphone 103 and speaker 104 may not be connected to case 601.

Similar to the second embodiment, amplifier 120 at the side of microphone 103 may be built in microphone 103. Also, amplifier 130 at the side of speaker 104 may be provided within picture transmission unit 200-3.

While the present invention has been described by the first to third embodiments, only for the purpose of expressing the contents of the technique, the present invention should not be interpreted to be restricted to these first to third embodiments in a narrow way. Various modification and alternation can be made within the scope and the sprits of the present invention, and the present invention should only be restricted to the following claims. The following items (a) to (j) are examples of the modifications:

(a) While audio signal from microphone 103 is outputted in video camera units 100-1 and 100-2 shown in FIGS. 1 to 3, no audio signal may be used depending upon an intended purpose. In this case, amplifier 120 and audio signal encoder 250 and the like can be omitted, making it possible to simplify the configuration of circuit. Also, in the case where no speaker 104 is used in the first to third embodiments, amplifier 130 and audio signal encoder 260 and the like can be omitted, making it possible to much more simplify the configuration of circuit.

(b) The kinds of the video camera units, for example, video camera units 100-1 to 100-4, amongst the plurality kind of the video camera units are not restricted to two kinds, i.e., a large size and a small size ones. Also, each of picture transmission units 200-1 to 200-3 shown in FIGS. 2, 3, 7 and 9 can be commonly used to three or more kinds of video camera units without changing hardware by changing the program and logic conditions.

(c) The compression coding format, transmission rate, transmission medium, communication protocol and the like are not restricted to those exemplified herein. Also, two nonvolatile memories 281 and 282 for storing the coding format and the procedure corresponding to communication protocol may be replaced by one nonvolatile memory for storing both the coding format and the procedure corresponding to communication protocol.

(d) Speaker 104 shown in FIG. 1 may be provided not on the side of video camera unit 100-1 but on the side of picture transmission unit 200-1.

(e) In video camera unit 100-1 shown in FIGS. 1 and 2, an earphone jack may be provided instead of speaker 104.

(f) In picture transmission system shown in FIG. 1, if lock pins 106a, 106b and 106c and lock pin holders 204a, 204b and 204c can be configured with good accuracy, guide pin 105 and guide pin holder 203 may not be provided.

(g) Number of connectors 107a, 107b, 206a, and 206b, which connect video camera unit 100-1 or 100-2 to picture transmission unit 200-1 shown in FIGS. 1 to 3 should not be restricted to one or two. Many connectors may be used as occasion demands.

(h) In picture transmission systems shown in FIGS. 2, 3, 7 and 9, picture signal S110 outputted from each of video camera units 100-1 to 100-4 to each of picture transmission units 200-1 to 200-3 should not be restricted to NTSC. PAL (Phase Alternation by Line), SECAM (Sequential A Memoir) or such is similarly applicable. In this case, picture signal decoder 210 corresponding to applied picture signal S110 may be used.

(i) In each of picture transmission units 200-1 to 200-3 shown in FIGS. 2, 3, 7 and 9, if audio signal is transmitted without compression, compression circuits within audio signal encoder 250 and audio signal decoder 260 may be omitted, making it possible to simplify the circuit configurations of audio signal encoder 250 and audio signal decoder 260.

(j) In picture transmission units 200-1 and 200-3 shown in FIGS. 3 and 9, since no output for control signal S270 is needed, control signal decoding means 270 and the like relating to this control signal S270 may be omitted, making it possible to simplify the circuit configuration.

What is claimed is:

1. A picture transmission unit comprising:
a camera holding mechanism portion which detachably holds a video camera unit having at least one connector at a prescribed portion;
a connector portion having at least one connector provided so that the corresponding connector can be inserted into the connector of the video camera unit side;
compression/coding means, which converts an output signal from the video camera unit into a compressed signal according to a prescribed coding format and outputs it;
transmission/coding means, which converts said compressed signal into a coded signal for transmission according to a prescribed communication protocol and outputs it; and
interface means, which converts said coded signal into a signal corresponding to a prescribed transmission medium, and transmits it to said transmission medium.

2. A picture transmission unit comprising:
a camera holding mechanism portion which detachably holds a video camera unit having at least one connector at a prescribed portion;
a connector portion having at least one connector provided so that the corresponding connector can be inserted into the connector of the video camera unit side;
compression/coding means, which converts an output signal from the video camera unit into a compressed signal according to a prescribed coding format and outputs it;
audio signal decoding means, which decodes a given coded audio signal to be converted into an analog audio signal, and outputs it to said video camera unit;
transmission/coding means, which converts said compressed signal into a coded signal for transmission according to a prescribed communication protocol and outputs it, and which outputs said coded audio signal to said audio signal decoding means; and
interface means, which inputs the coded signal and converts it to a signal corresponding to a prescribed transmission medium, and transmits it to said transmission medium, and which receives the coded audio signal having been transmitted via transmission medium, and give it to said transmission/coding means.

3. A picture transmission unit comprising:
a camera holding mechanism portion which detachably holds a video camera unit having at least one connector at a prescribed portion;
a connector portion having at least one connector provided so that the corresponding connector can be inserted into the connector of the video camera unit side;
compression/coding means, which converts an output signal from the video camera unit into a compressed signal according to a prescribed coding format and outputs it;
control signal decoding means, which decodes a given transmission control signal and outputs a control signal for controlling the whole of the video camera unit;
transmission/coding means, which converts said compressed signal into a coded signal for transmission according to a prescribed communication protocol and outputs it, and which outputs said transmission control signal to give it to said control signal decoding means; and
interface means, which inputs the coded signal, converts it into a prescribed signal and transmits it to said transmission medium, and which receives the transmission control signal transmitted via the transmission medium and gives it to the transmission/coding means.

4. The picture transmission unit according to any one of claims 1 to 3, wherein the camera holding mechanism portion possesses a fulcrum for slidably guiding and supporting the video camera unit to a prescribed position and a lock pin holder for holding a lock pin residing at the video camera unit side.

5. The picture transmission unit according to any one of claims 1 to 3, wherein the connector portion has a first connecter for receiving a signal outputted from the video camera unit and a second connecter for transmitting a signal for the video camera unit.

6. The picture transmission unit according to any one of claims 1 to 3, wherein the compression/coding means and the transmission/coding means each has a rewritable nonvolatile memory for storing programs with procedures corresponding to the coding format and the communication protocol respectively, a digital signal processor, which executes signal processing according to the program stored in the memory, and a field programmable logic array, which executes logical operation according to set the logic conditions.

7. The picture transmission unit according to any one of claims 1 to 3, wherein the interface means has interfaces corresponding to a cable signal, a wireless signal and an optical signal.

8. A picture transmission system comprising the picture transmission unit according to any one of claims 1 to 3 and a video camera unit corresponding to the picture transmission unit.

9. A picture transmission system comprising the picture transmission unit according to claim 4 and a video camera unit corresponding to the picture transmission unit.

10. A picture transmission system comprising the picture transmission unit according to claim 5 and a video camera unit corresponding to the picture transmission unit.

11. A picture transmission system comprising the picture transmission unit according to claim 6 and a video camera unit corresponding to the picture transmission unit.

12. A picture transmission system comprising the picture transmission unit according to claim 7 and a video camera unit corresponding to the picture transmission unit.

13. A picture transmission system having a picture transmission unit connected to a prescribed transmission medium and a plurality kind of video camera units to be connected to the picture transmission unit in a replaceable manner;

said picture transmission unit comprising:

compression/coding means, which converts a picture signal inputted from the video camera unit into a compressed picture signal according to a coding program with a procedure corresponding to a prescribed coding format and first logic conditions and outputs it;

control signal decoding means, which decodes a given transmission control signal to produce a control signal, and which outputs the produced control signal to the video camera unit;

an audio signal encoder, which compresses and encodes a first analog audio signal inputted from external voice and sound/audio signal converting means;

an audio signal decoder, which expands and decodes a given second compressed digital audio signal and outputs a second analog audio signal to external audio signal/audio converting means;

transmission/coding means, which converts the compressed picture signal and the first compressed digital audio signal into a first encoded signal and outputs it, and which receives a given second encoded signal to be separated into the transmission control signal and the second digital audio signal, and gives them to the control signal decoding means and the audio signal decoder respectively; and interface means, which inputs the first encoded signal, converts it into a signal corresponding to the transmission medium, and transmit it to the transmission medium, and which receives the second encoded signal transmitted from the transmission medium, and gives it to the transmission/coding means;

the first video camera unit within the plurality kind of the video camera units possessing:

a first optical lens system, which takes a subject to obtain a first optical image;

first photoelectric conversion means, which converts the first optical image into an electric signal and outputs it;

first picture signal producing means, which is detachably connected to the compression/coding means, and which inputs the electric signal outputted from the first photoelectric conversion means to produce the picture signal, and gives it to the compression/coding means; and camera control means, which is detachably connected to the control signal decoding means, and which input the control signal outputted from the control signal decoding means to totally control the video camera units; and the second video camera unit within the plurality kind of the video camera units possessing:

a second optical lens system, which takes a subject to obtain a second optical image;

second photoelectric conversion means, which converts the second optical image into an electric signal and outputs it; and second picture signal producing means, which is detachably connected to the compression/coding means, and which inputs the electric signal outputted from the second photoelectric conversion means to produce the picture signal, and gives it to the compression/coding means.

* * * * *